United States Patent
Whysong et al.

[15] 3,688,300
[45] Aug. 29, 1972

[54] MAGNETIC TAPE FILE PROTECT SYSTEM

[72] Inventors: Dale C. Whysong, Falls Church; Dale E. Leininger, Fairfax, both of Va.

[73] Assignee: General Kinetics Inc., Reston, Va.

[22] Filed: Sept. 2, 1970

[21] Appl. No.: 69,182

[52] U.S. Cl. ....340/267 R, 179/100.2 D, 250/219 R, 250/222 R, 340/174.1 B, 340/282
[51] Int. Cl. .............................................G08b 21/00
[58] Field of Search............242/36, 57; 179/100.2 D; 340/174.1 B, 282, 267 R; 250/222 R, 219 R

[56] References Cited

UNITED STATES PATENTS

| | | |
|---|---|---|
| 1,988,255 | 1/1935 | Soons.....................250/219 R |
| 2,761,017 | 8/1956 | Camras................179/100.2 D |
| 3,474,753 | 10/1969 | Weyrich et al..179/100.2 D X |
| 3,564,155 | 2/1971 | Pendleton...........179/100.2 D |

*Primary Examiner*—David L. Trafton
*Attorney*—Cushman, Darby & Cushman

[57] ABSTRACT

A spring-loaded cylinder of the same diameter as the magnetic tape file protect ring is mounted on the transport reel hub assembly so that the cylinder will be spring-loaded its maximum distance from the transport front panel when the file protect ring is absent and is pressed back towards the panel when the file protect ring is present. A light and photocell are used to monitor the position of the cylinder. The photocell output then becomes the file protect signal for the using system.

4 Claims, 2 Drawing Figures

INVENTORS
DALE C. WHYSONG
DALE E. LEININGER

BY Cushman, Darby & Cushman
ATTORNEYS

MAGNETIC TAPE FILE PROTECT SYSTEM

BACKGROUND OF THE INVENTION

Magnetic recording tape transport device file protect systems used previously are basically of two types. One type "feels" for the file protect ring of the computer reel and upon detecting the ring withdraws the "feeling" probe and electrically locks the "file protect" signal into the system. A second type has a mechanical probe which rides against the file protect ring continuously. Both types are expensive to manufacture and consist of mechanical parts which wear out and are expensive to replace. The second type is the least reliable because the probe constantly riding on the turning reel quickly wears the bearings of the probe wheel.

One prior art system is described in IBM Customer Engineering Reference Manuals, for instance, that for the IBM 2401 Models 2 and 3 computer under various headings including "File Protection " and "Relay NFP1."

Most computer tape transport manufacturers, if not all, employ techniques similar to the IBM system. Some do not retract the feeler probe at all but allow it continually to contact the file protect ring. This is bad practice since both the file protect rings and the feeler probes wear rapidly while the wheel rotates and the feeler probe scrapes small particles of plastic dust from the file protect ring. These particles then become contaminants which drift onto the recording tape surface and produce errors in reading and writing the tape.

The device disclosed in the U.S. Pat. No. of Cheney, 3,199,093 issued Aug. 3, 1965, includes a magnetic reed switch which senses proximity to a removable mumetal ring on the tape reel to permit or prevent erasure. An object stated by the patentee is the elimination of need for frictional contact between the sensor and the part being sensed.

The following patents show the use of various mechanical probes for sensing the presence or absence of a file protect ring or similar element on a magnetic tape reel.

| | | |
|---|---|---|
| 2,466,514 | Vagtborg | April 5, 1949 |
| 2,594,848 | Begun | April 29, 1952 |
| 2,761,017 | Camras | August 28, 1956 |
| 3,145,944 | Pendleton | August 25, 1964 |
| 3,199,091 | Barkhuff et al. | August 3, 1965 |
| 3,259,712 | Libby | July 5, 1966 |
| 3,335,410 | Baskin et al. | August 8, 1967 |
| 3,417,387 | Rayfield | December 17, 1968 |
| 3,474,753 | Weyrich et al. | October 28, 1969 |

In the U.S. Pat. No. of Brenner, 3,109,604, a photoelectric sensor is used to adjust the tension applied to tape being wound. The tape itself enters into the sensing process and no file protect system is disclosed.

SUMMARY OF THE INVENTION

In order to eliminate need for complex mechanical movements and reduce the potential for dirt generation due to frictional contact between file protect ring sensors and the plastic material of the file protect ring, there is provided a spring-loaded cylinder of the same diameter as the file protect ring is mounted on the transport reel hub assembly so that the cylinder will be spring-loaded its maximum distance from the transport front panel when the file protect ring is present. A light and photocell are used to monitor the position of the cylinder. The photocell output then becomes the file protect signal for the using system. This technique eliminates fatigue-prone components of other systems. With the use of long-life bulbs 5,000 hours of use can be expected before the bulb needs replacing, and bulbs are easily and inexpensively replaced.

The principles of the invention will be further hereinafter discussed with reference to the drawing wherein a preferred embodiment is shown. The specifics illustrated in the drawing are intended to exemplify, rather than limit, aspects of the invention as defined in the clause.

DISCUSSION OF THE PRESENTLY PREFERRED EMBODIMENT OF THE INVENTION

Figure 1:
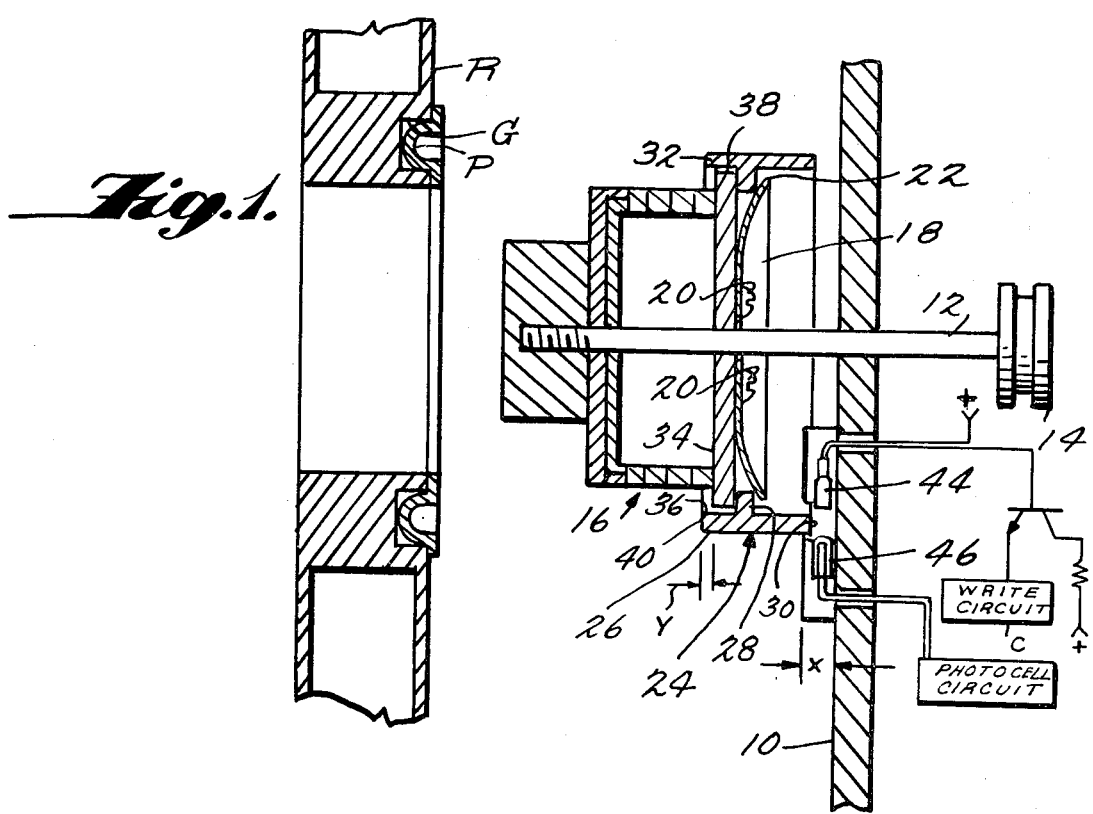
FIG. 1 is a longitudinal sectional view of a tape transport reel drive assembly equipped with a file protect system in accordance with the principles of the invention, a reel containing a file protect ring being about to be installed on the assembly.

A conventional drive mounting panel is depicted at 10 having an opening which receives a shaft 12. Behind the panel a conventional drive pulley 14 is mounted on the shaft. In front of the panel, a transport reel hub 16 is mounted on the shaft 12. The hub 16 is conventional excepting that an annular spring 18, e.g., of beryllium copper is mounted, e.g., by screws 20, on the rear face of the hub 16 so that its outer peripheral region 22 normally lies spaced behind the rear face of the hub 16. In addition a sensing collar 24 in the form of an axially short tubular member 26 is provided, having an internal flange 28 intermediate its axial extent. Normally, the sensing collar is mounted so that the shoulder 28 is resiliently gripped between the rear face of the hub 16 and the peripheral region 22 of the spring 18. In such disposition, the inner end region 30 of the collar 24 lies spaced a short distance X in front of the panel 10 and the outer end region 32 of the collar 24 lies a short distance Y forwardly of the reel abutment surface 34 of the hub 16. The inner peripheral surface 36 of the end region 32 lies adjacent the outer periphery of the disk shaped portion 38 of the hub whose front surface constitutes the reel abutment surface 34. The end surface 40 of the end region 32 lies in such axial disposition as to be freely received in the file protect ring receiving groove G of the standard reel R when the file protect ring P is removed (i.e., not present) but to engage the file protect ring P when it is in place. The engagement begins as the reel is being pushed home on the hub 16, i.e., before the rear face of the reel has abutted the reel abutment surface 34. In this second instance, pushing the reel further onto the hub causes the sensing collar to be moved axially rearwardly against resilient force offered by the spring 18 peripheral region 22 until the forward end surface 40 of the collar front end region 32 lies in the substantially same plane as the abutment surface 34 (i.e., the distance Y has been reduced to zero).

It should now be noticed that the system disclosed further includes a signal emitter 44 and a signal sensor 46 both mounted on the front of the drive mounting panel. The two elements 44, 46 are spaced from but aimed toward one another on opposite sides of an axially rearward projection of the sensing collar inner end region 30 on the drive mounting panel 10.

The configurations are such that when the file protect ring is absent from a reel mounted on the hub, the collar 24 is in its rest position and the two elements 44, 46 are in unobstructed communication, but when the file protect ring is present in the groove of a reel mounted on the hub, the collar 24 is displaced rearwardly sufficiently that its rear portion 30 obstructs, i.e., blinds, communication between the two elements 44 and 46.

In the preferred embodiment depicted, the signal emitter is an electric light and the signal sensor is a photocell. The locations of the two devices may be physically interchanged and equivalent sensors and emitters based on emission and reception of energy of other wavelengths or types (e.g., ultrasound) may be substituted.

One might ask whether failure of the photocell to see the light could ambiguously indicate either of two circumstances: the presence of the file protect ring P or that the light 44 had burned out. However, in practice, the electrical current for the light is supplied via the same circuit that enables the write circuit C so that if the light bulb burns out, writing cannot be enabled. Writing is enabled only when the following conditions are present simultaneously: the collar 24 is axially deflected rearwardly by the presence of a file protect ring P in the groove G of the reel R mounted on the hub 16 and the light bulb is not burned out.

Preferably, long-life light bulbs having about 5,000 hours of life are used.

Note that because the collar 24 rotates with the hub and reel that there is no rubbing contact to produce wear and contaminating particles.

Figure 2:
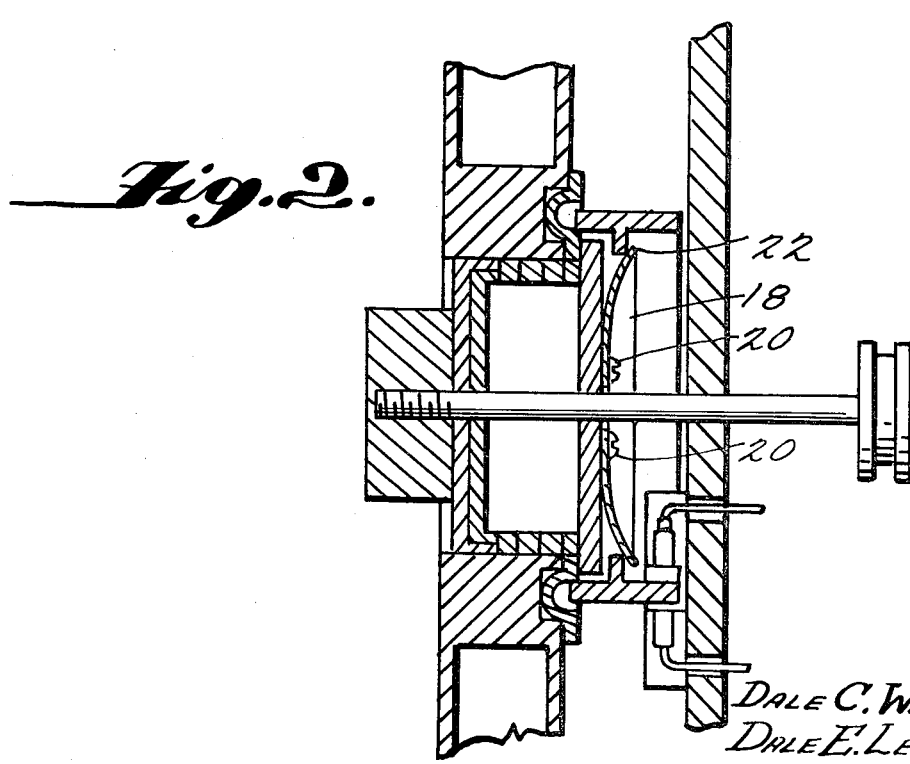
FIG. 2 is a view of the apparatus of FIG. 1 after installation of the ring-containing reel on the assembly.

Note further that when a reel having a file protect ring is removed from the hub, the spring peripheral portion 22 in seeking to return to a less stressed state will move the collar 24 axially forwardly from the position shown in FIG. 2 to the one shown in FIG. 1.

As an alternative, the file protect system can be set up so that ability of the photocell (or other sensor) to see the light (or other emitter) makes writing possible. This can be done by moving the light and photocell sufficiently out from the drive mounting panel that the rear end region 30 of the collar 24 normally lies between the light and the photocell. In such instance the region 30 is provided with an axially narrow, circumferentially extending band of openings through which the photocell can see the light upon axially rearward displacement of the collar caused by contact of the front end of the collar with the file protect ring P on a reel R.

It should now be apparent that the file protect system as described hereinabove possesses each of the attributes set forth in the specification under the heading "Summary of the Invention" hereinbefore. Because the file protect system of the invention can be modified to some extent without departing from the principles of the invention as they have been outlined and explained in this specification, the present invention should be understood as encompassing all such modifications as are within the spirit and scope of the following claims.

What is claimed is:

1. In a tape transport system wherein a tape reel having a face grooved to removably receive a file protect ring the reel being removably mounted on a transport hub having a surface abutted by the reel face when the reel is properly positioned on the hub, an improved file protect system including:

a file protect ring sensing member;

means mounting said sensing member on the hub for limited axial movement thereon between one extreme wherein a forward portion the sensing member protrudes forwardly of the reel face abutted surface of the hub and another extreme wherein said forward portion of the sensing member protrudes forwardly to a lesser extent, whereby said sensing member extends rearwardly to a first, lesser extent in said one extreme and to a second, greater extent in said other extreme;

said mounting means resiliently disposing said sensing member toward said first extreme, but allowing said sensing member to be forced, against resilient disposition, from said one extreme to the other;

the forward portion of said sensing member being configured and disposed in axial alignment with the location of the groove of the grooved face of the reel to freely enter the groove when the file protect ring is absent from the groove and to encounter the file protect ring when the file protect ring is present in the groove, whereby when the reel, without a file protect ring, is mounted on the hub and abutted against the hub surface, the forward portion of the sensing member freely enters the groove and the sensing member remains disposed in the first extreme and whereby when the reel, with a file protect ring, is mounted on the hub and abutted against the hub surface, the forward portion of the sensing member encounters the file protect ring whereupon the sensing member is forced back to the other extreme thereof;

a signal emitter;

a signal sensor adapted to sense signals emitted by said signal emitter only when the sensor is in unobstructed communication with the emitter;

said signal emitter and said signal sensor being disposed on opposite sides of an axially rearward projection of said sensing member at such an axial disposition that, in a first instance, when said sensing member is in a first of its one and other extremes, the signal emitter and signal sensor are in unobstructed communication and, in a second instance, when said sensing member is in a second of its one and other extremes, the signal emitter and signal sensor are blocked from unobstructed communication;

said signal sensor being adapted to be interposed in a write-enable circuit to permit writing in only one of said first and second instances.

2. The improved file protect system of claim 1 wherein the signal emitter is an electric light and the signal sensor is a photocell.

3. The improved file protect system of claim 1 wherein the sensing member comprises a tubular collar circumscribing the hub and having means defining a radially inwardly directed flange thereon intermediate the axial extent thereof. Said mounting means comprising an annular flat spring mounted on the hub and having an outer peripheral portion trapping said radially inwardly directed flange against the rear of the hub.

4. In a tape transport system which includes a write-enable circuit and a rotatable hub for removable receiving a tape reel, and improved file protect system for use with tape reels having removably received file protect rings in grooves thereon, the improved file protect system comprising:

a sensing member mounted on said hub for rotation therewith;

means resiliently biasing the sensing member forwardly so that, if a tape reel being mounted on the hub has no file protect ring, the sensing member will enter the tape reel groove, but if the tape reel being mounted on the hub has a file protect ring in the groove thereof, the sensing member will engage and be pushed rearwardly against restoring force provided by said resiliently biasing means;

a light;

a photocell incorporated in said write enable circuit, said light and said photocell being so mounted with respect to said sensing member, that when the sensing member is positioned forwardly, the light illuminates the photocell and when the sensing member is positioned rearwardly because it has engaged a file protect ring, the light is obstructed by the sensing member from illuminating the photocell.

* * * * *